Nov. 11, 1952 — M. W. TUCKER — 2,617,349
FRESHENING APPARATUS FOR BAKED FOOD
Filed Aug. 1, 1949 — 2 SHEETS—SHEET 1

Inventor
Maynard W. Tucker

By *Clarence A. O'Brien and Harvey B. Jacobson*
Attorneys

Nov. 11, 1952　　　　　M. W. TUCKER　　　　2,617,349
FRESHENING APPARATUS FOR BAKED FOOD
Filed Aug. 1, 1949　　　　　　　　　　　　2 SHEETS—SHEET 2

Maynard W. Tucker
INVENTOR.

Patented Nov. 11, 1952

2,617,349

UNITED STATES PATENT OFFICE 2,617,349

FRESHENING APPARATUS FOR BAKED FOOD

Maynard W. Tucker, Morley, Mich.

Application August 1, 1949, Serial No. 108,036

1 Claim. (Cl. 99—234)

This invention relates to new and useful improvements and structural refinements in apparatus for freshening baked food such as buns, cakes, rolls, bread, pie, etc., and the principal object of the invention is to provide an apparatus of the character herein described, whereby such food may be softened, moistened and otherwise freshened in a highly convenient and expeditious manner.

This object is achieved by forcible injection of steam into the food, and the primary feature of the invention resides in the provision of a food receiving platform equipped with a set of hollow, tubular prongs which are adapted to project into the article of food placed on the platform, while another feature of the invention involves the provision of means for generating steam and delivering the same through the aforementioned prongs into the article which is to be freshened.

Some of the advantages of the invention reside in its simplicity of construction and operation, in its pleasing appearance, and in its adaptability to economical manufacture.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
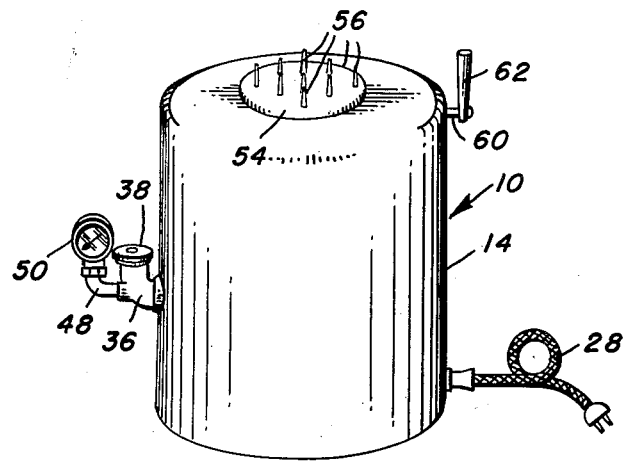
Figure 1 is a perspective view of the invention.
Figure 2:
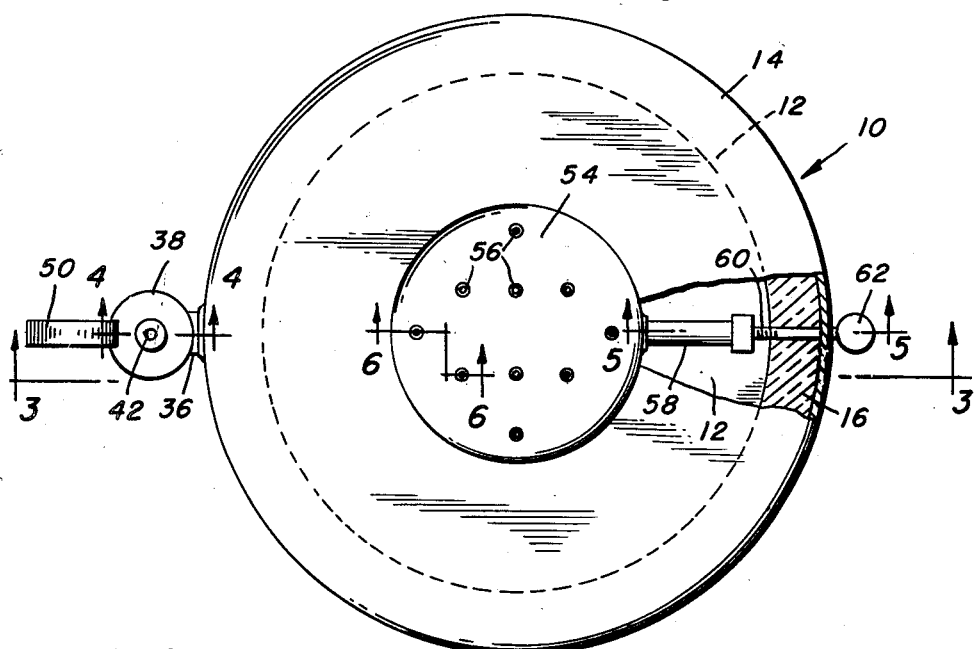
Figure 2 is a top plan view thereof, the same being partially broken away so as to reveal its construction.

Referring now to the accompanying drawings in detail, the invention consists of a freshening apparatus for baked food, this being designated generally by the reference character 10 and embodying in its construction a substantially cylindrical boiler 12 enclosed in spaced relation by a similarly configurated jacket 14, a packing of suitable insulating material 16 being provided in the space between the boiler and the jacket so as to minimize outward dissipation of heat from the boiler, as will be clearly apparent.

An electric heating element 18 is provided under the bottom of the boiler 12, within the jacket 14 (see Figure 3) this element having two terminals 20, 22, the former of which is connected directly by means of a conductor 24 to an entrance socket 26 provided on the jacket 14 and supplied with electric current by means of an attachment cord 28.

On the other hand, the remaining conductor 22 of the element 18 is connected as at 30 to one terminal of a thermostatic switch 32, the remaining terminal of which, in turn, is connected as at 34 to the entrance socket 26, as will be clearly apparent. The thermostatic switch 32 is preferably in physical contact with the bottom of the boiler 12, so that the temperature of the boiler may be maintained at more-or-less a constant degree.

A suitable filler neck 36 extends outwardly from the boiler 12 through the jacket 14 and is equipped with a removable filler cap 38, whereby the boiler may be filled with water. However, it is to be noted that since the filler neck 36 is disposed intermediate the upper and lower ends of the boiler, the latter may be filled with water only to a predetermined height, or level, as exemplified at 40, thus leaving sufficient space in the upper portion of the boiler for generation of steam.

Figure 4:
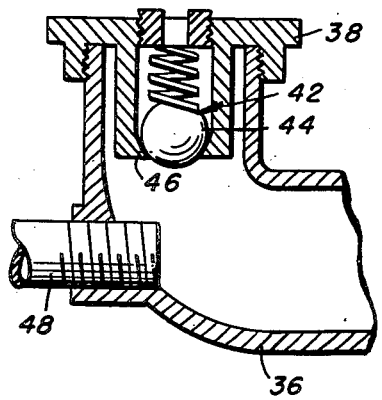
Figure 4 is a cross sectional detail, taken substantially in the plane of the line 4—4 in Figure 2.

To avoid the possibility of abnormal steam pressure being created in the boiler, a safety valve 42 is provided on the filler cap 38, this valve simply consisting of a spring pressed ball 44 engaging a seat 46, as is best shown in Figure 4. Moreover, a pipe or tube 48 extends from the filler neck 36 and carries a conventional pressure gauge 50 for obvious reasons.

The essence of novelty in the invention resides in the provision of a disk-shaped steam chest 52 which is mounted on the top wall of the boiler 12 and projects upwardly and outwardly through the top wall of the jacket 14, thus affording what may be referred to as a food receiving platform 54.

Figure 6:
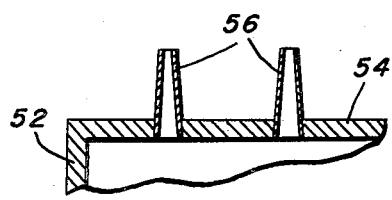
Figure 6 is a fragmentary cross sectional detail, taken substantially in the plane of the line 6—6 of Figure 2.

A set of tubular, upwardly tapered prongs 56 extend in an upward direction from the platform 54, these prongs having open upper and lower ends and communicating at the lower ends thereof with the interior of the steam chest 52, as is best shown in Figure 6.

Figure 5:
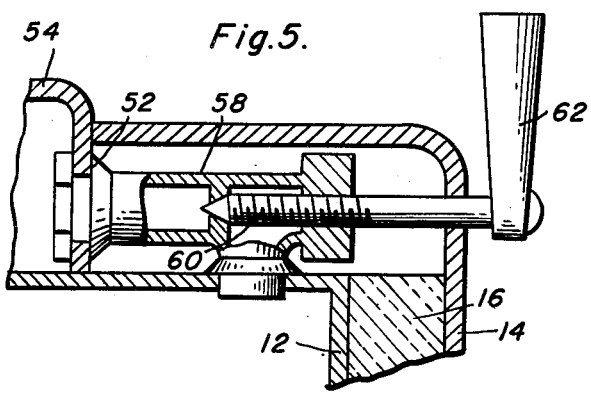
Figure 5 is a cross sectional detail, taken substantially in the plane of the line 5—5 of Figure 2.

The steam chest 52 communicates with the interior of the boiler 12 by means of a steam pipe or connection 58 which is disposed in the space between the boiler and the jacket 14 and is provided with a "screw threaded needle" type control valve 60, as illustrated in Figure 5. The valve needle 60 projects outwardly from the jacket 14 and carries a suitable handle 62, it being apparent from the foregoing that by simply manipulating this handle, the rate of discharge or delivery of steam from the boiler into the steam chest 52 and through the prongs or nozzles 56 may be controlled as desired.

When the invention is placed in use, an article of food, such as for example, a bun, bread, pie, etc., is simply positioned on the platform 54 so that the nozzles or prongs 56 embed themselves into the food (this embedding being facilitated by the upwardly tapered configuration of the prongs) after which the valve handle 62 is manipulated so as to deliver steam under proper pressure and at suitable rate from the boiler 12 into the chest 52 and through the nozzles or prongs 56 into the texture or material of the article of food, whereby the latter will become moistened, softened and otherwise freshened, as will be clearly apparent.

Figure 3:
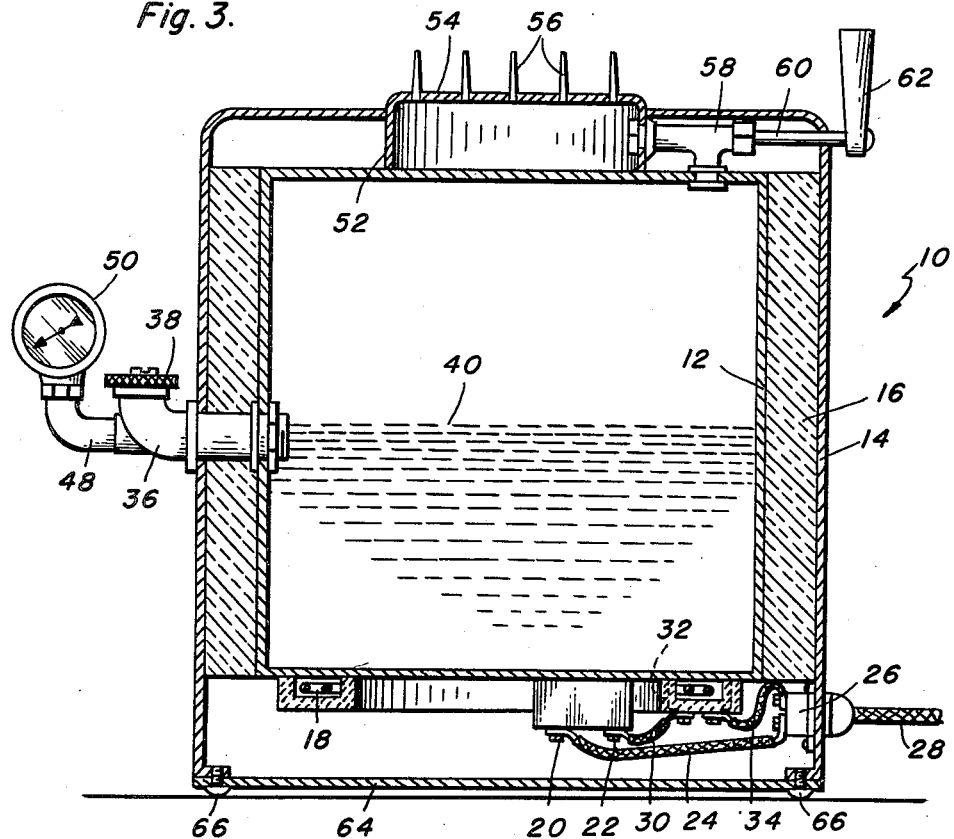
Figure 3 is a cross sectional view, taken substantially in the plane of the line 3—3 of Figure 2.

If desired, the bottom wall 64 of the boiler jacket 14 may be removably secured in position by a plurality of studs 66, so as to facilitate access to the boiler heating unit 18, it being noted that the same studs 66 also function as supporting legs for the entire apparatus, as shown in Figure 3.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a freshening apparatus for baked food, the combination of a boiler, a jacket enclosing said boiler in spaced relation, a steam chest provided in the space between the boiler and said jacket and affording a substantially horizontal food receiving platform disposed exteriorly of the jacket, a set of substantially tubular food engaging prongs projecting upwardly from said platform and communicating at their lower ends with said chest, and a connection disposed entirely in said space for delivering steam from said boiler into said chest.

MAYNARD W. TUCKER.

REFERENCES CITED

The following references are of record in the file of this patent:

UNITED STATES PATENTS

| Number | Name | Date |
|---|---|---|
| 1,152,241 | Tomlinson | Aug. 31, 1915 |
| 1,524,936 | Johnson | Feb. 3, 1925 |
| 1,658,579 | Strohbach | Feb. 7, 1928 |
| 2,469,778 | Morici | May 10, 1949 |